(12) United States Patent
Gay et al.

(10) Patent No.: US 8,091,029 B1
(45) Date of Patent: Jan. 3, 2012

(54) PRESENTER-ONLY MEETING CANVAS FOR COLLABORATIVE ELECTRONIC MEETING SPACE

(75) Inventors: Jonathan Gay, Mill Valley, CA (US); Giacomo Guilizzoni, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1099 days.

(21) Appl. No.: 10/856,734

(22) Filed: May 28, 2004

(51) Int. Cl.
*G06F 15/177* (2006.01)
*G06F 3/00* (2006.01)

(52) U.S. Cl. .................... 715/734; 715/751; 715/753

(58) Field of Classification Search .................. 715/719, 715/756, 751, 810, 753, 734
See application file for complete search history.

(56) References Cited

U.S. PATENT DOCUMENTS

| | | | |
|---|---|---|---|
| 5,471,318 A | 11/1995 | Ahuja et al. | |
| 5,822,525 A | 10/1998 | Tafoya et al. | |
| 5,956,487 A | 9/1999 | Venkatraman et al. | |
| 5,996,002 A | 11/1999 | Katsurabayashi et al. | |
| 5,999,208 A | 12/1999 | McNerney et al. | |
| 6,091,408 A | 7/2000 | Treibitz et al. | |
| 6,119,147 A | 9/2000 | Toomey et al. | |
| 6,144,991 A | 11/2000 | England | |
| 6,237,025 B1 | 5/2001 | Ludwig et al. | |
| 6,334,141 B1 | 12/2001 | Varma et al. | |
| 6,560,637 B1 | 5/2003 | Dunlap et al. | |
| 6,564,246 B1 * | 5/2003 | Varma et al. | 709/205 |
| 6,789,105 B2 * | 9/2004 | Ludwig et al. | 709/204 |
| 6,938,069 B1 | 8/2005 | Narayanaswamy | |
| 7,007,235 B1 * | 2/2006 | Hussein et al. | 715/751 |
| 7,213,030 B1 | 5/2007 | Jenkins | |
| 7,240,287 B2 | 7/2007 | Qureshi et al. | |
| 7,249,157 B2 | 7/2007 | Stewart et al. | |
| 7,383,302 B2 | 6/2008 | Cohen et al. | |
| 7,512,887 B2 | 3/2009 | Keohane et al. | |
| 2001/0013843 A1 | 8/2001 | Fujiwara et al. | |
| 2002/0075305 A1 | 6/2002 | Beaton et al. | |
| 2002/0156808 A1 | 10/2002 | Duffy et al. | |
| 2003/0065722 A1 | 4/2003 | Ieperen | |
| 2003/0095113 A1 | 5/2003 | Ma et al. | |
| 2003/0110218 A1 | 6/2003 | Stanley | |
| 2003/0145052 A1 | 7/2003 | Watanabe | |
| 2003/0208534 A1 | 11/2003 | Carmichael | |
| 2003/0222890 A1 | 12/2003 | Salesin et al. | |
| 2003/0236830 A1 | 12/2003 | Ortiz et al. | |
| 2004/0008221 A1 | 1/2004 | O'Neal et al. | |
| 2004/0039834 A1 | 2/2004 | Saunders et al. | |
| 2004/0051744 A1 | 3/2004 | Fukui et al. | |

(Continued)

OTHER PUBLICATIONS

Non-Final Office Action for U.S. Appl. No. 10/857,254, mailed Jun. 5, 2008.

(Continued)

*Primary Examiner* — Doug Hutton, Jr.
*Assistant Examiner* — Soumya Dasgupta
(74) *Attorney, Agent, or Firm* — Kilpatrick Townsend & Stockton LLP

(57) ABSTRACT

A collaborative electronic meeting environment is described that provides an additional presentation canvas to the active meeting canvas that is only accessible by meeting presenters. Using this presentation canvas, additional meeting objects may be established by the presenters or even created and staged by a presenter to be dragged onto the meeting canvas for use during the active meeting. The meeting participants who are not presenters may not view or interact with this presentation canvas or any of the objects located thereon.

18 Claims, 7 Drawing Sheets

U.S. PATENT DOCUMENTS

| | | | |
|---|---|---|---|
| 2004/0081951 | A1 | 4/2004 | Vigue et al. |
| 2004/0217946 | A1 | 11/2004 | Hamano |
| 2004/0230651 | A1 | 11/2004 | Ivashin |
| 2004/0252185 | A1* | 12/2004 | Vernon et al. ............... 348/14.08 |
| 2005/0044167 | A1* | 2/2005 | Kobayashi et al. ........... 709/217 |
| 2005/0114475 | A1 | 5/2005 | Chang et al. |
| 2005/0114521 | A1 | 5/2005 | Lee et al. |
| 2005/0273510 | A1 | 12/2005 | Schuh |
| 2006/0048058 | A1 | 3/2006 | O'Neal et al. |
| 2006/0053196 | A1 | 3/2006 | Spataro et al. |
| 2006/0095376 | A1 | 5/2006 | Mitchell et al. |
| 2006/0098174 | A1 | 5/2006 | Ohuchi |
| 2007/0006080 | A1 | 1/2007 | Finger et al. |
| 2007/0130177 | A1 | 6/2007 | Schneider et al. |

OTHER PUBLICATIONS

Dewan, et al. "Flexible user interface coupling in a collaborative system," In Proceedings of the SIGCHI Conference on Human Factors in Computing Systems: Reaching Through Technology (New Orleans, Louisiana, United States, Apr. 27-May 2, 1991). S. P. Robertson, G. M.Olson, and J. S. Olson, Eds. CHI'91. ACM, NY, NY, pp. 41-48.

Sun, et al., D. 2002. "Consistency maintenance in real-time collaborative graphics editing systems," ACM Trans. Comput.Hum. Interact. 9, 1 (Mar. 2002), pp. 1-41.

Swamy, et al., "Internet-based educational control systems lab using NetMeeting," Education, IEEE Transactions, vol. 45, No. 2, pp. 145-151, May 2002.

Final Office Action for U.S. Appl. No. 10/857,254, mailed Nov. 25, 2008.

Non-final Office Action for U.S. Appl. No. 10/857,254, mailed May 13, 2009.

Chiu, et al., LiteMinutes: an Internet-based system for multimedia meeting minutes. In Proceedings of the 10th international Conference on World Wide Web (Hong Kong, Hong Kong, May 1-5, 2001) WWW'01, ACM, New York, NY, 140-149.

Anderson, et al., Experiences with a tablet PC based lecture presentation system in computer science courses. In Proceedings of the 35th SIGCSE Technical Symposium on Computer Science Education (Norfolk, Virginia, USA, (Mar. 3-7, 2004). Sigcse 04, ACM, New York, NY 56-60.

Notice of Allowance in U.S. Appl. No. 10/857,254.

* cited by examiner

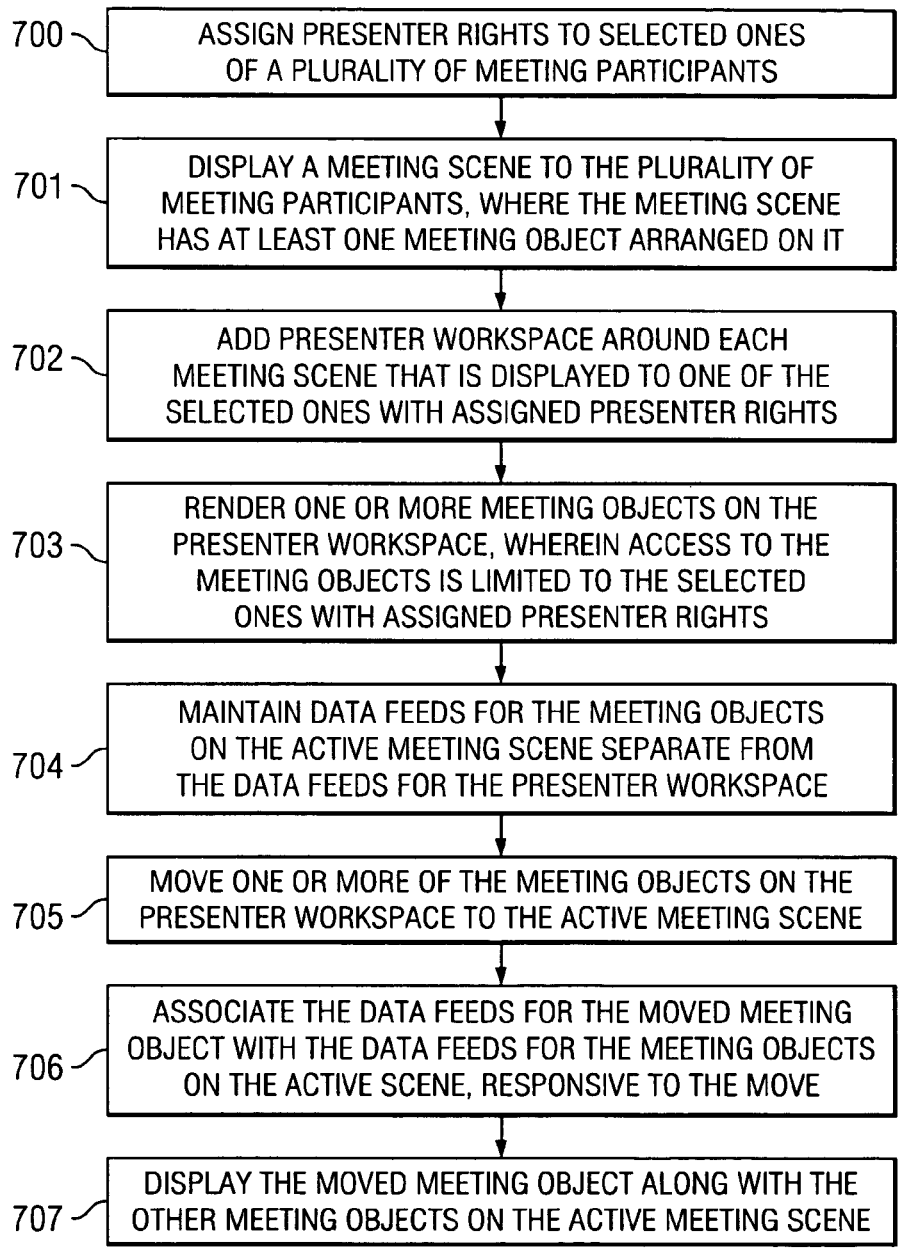

PRESENTER-ONLY MEETING CANVAS FOR COLLABORATIVE ELECTRONIC MEETING SPACE

CROSS-REFERENCE TO RELATED APPLICATIONS

The present application is related to concurrently filed, commonly assigned, and co-pending U.S. patent application Ser. No. 10/857,254, entitled "DYNAMICALLY ADAPTABLE COLLABORATIVE ELECTRONIC MEETING SPACE," the disclosure of which is hereby incorporated herein by reference.

TECHNICAL FIELD

The present invention relates, in general, to collaborative electronic meeting space, and, more specifically, to an additional meeting canvas accessible only by meeting presenters.

BACKGROUND OF THE INVENTION

The first Internet was a communications system funded and built by researchers for military use. This Internet, originally known as ARPANET, was embraced by the research and academic communities as a mechanism for scientists to share and collaborate with other scientists. This collaborative network quickly evolved into the information superhighway of commerce and communication. The Internet explosion was due, in part, to the development of the World Wide Web (WWW) and graphically-based Web browsers, which facilitated a more graphically-oriented, multimedia system that uses the infrastructure of the Internet to provide information in a graphical, visual, and interactive manner that appeals to a wider audience of consumers seeking instant gratification.

As the technology underlying transmission bandwidth has grown in conjunction with the accessibility to such increasing transmission bandwidth, a new paradigm for the old idea of Internet collaboration is emerging that takes advantage of the modern graphical, visual world. This new paradigm is also driven by the advance in real-time or time-sensitive data transmission technology, such as Voice over Internet Protocol (VoIP) technology, and the like. Non-Internet videoconferencing, which has generally never been able to completely supplant teleconferencing as a viable means for reliable communications, is slowly fading away in favor of Internet-driven technology, such as collaborative electronic meetings. Services, such as WEBEX COMMUNICATIONS, INC.'S, WEBEX™ electronic meeting or collaboration services offer the ability for users to connect, at least initially, across the Internet to share voice, video, and data in real time for meetings, presentations, training, or the like.

In such collaborative meeting environments, a virtual meeting room typically is made up of several meeting objects which are generally containers for presentation information, such as slides, video, audio, documents, computer applications, and the like, that are themselves contained within the container of the meeting room. These meeting objects are typically placed into a static arrangement on the actual electronic meeting interface. Therefore, chat objects may be set on the bottom right of each meeting interface screen, while slide or other main presentation objects are set on the left half of each meeting interface screen. Meeting presenters usually enter the electronic meeting room shortly before the meeting to prepare the various objects with data, such as slides, animation, data, or the like. Once the meeting begins, each of the meeting participants, both presenters and viewers, see the same static meeting interface with the presenters information loaded thereon.

In some versions of current electronic meeting applications, a presenter may be able to layer different presentation or meeting objects that may be uncovered or hidden by selecting tabs. However, from meeting to meeting, the arrangement of the various meeting objects will be the same or similar with all meeting participants viewing the same meeting set up. The presenter will typically not be able to add anything to an ongoing meeting except through a live screen share or other such facility. Moreover, in a large meeting where there may be multiple presenters, if one presenter needs to communicate with another, the existing meeting interface would need a chat object that allows a user to select the individual participants in order to effect that communication. If no chat object existed, it would be more complicated for one presenter to communicate with another.

BRIEF SUMMARY OF THE INVENTION

Representative embodiments of the present invention are directed to a collaborative electronic meeting system that provides an additional presentation canvas surrounding the active meeting canvas that is only accessible by a meeting presenter. Using this presentation canvas, additional meeting objects may be used by the presenters or even created and staged by the presenter to be dragged onto the meeting canvas for use during the active meeting. The meeting participants who are not presenters may not view this presentation canvas or any of the objects located thereon.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 7 is a flowchart illustrating example steps that may be executed in implementing one embodiment of the present invention.

DETAILED DESCRIPTION OF THE INVENTION

Figure 1:
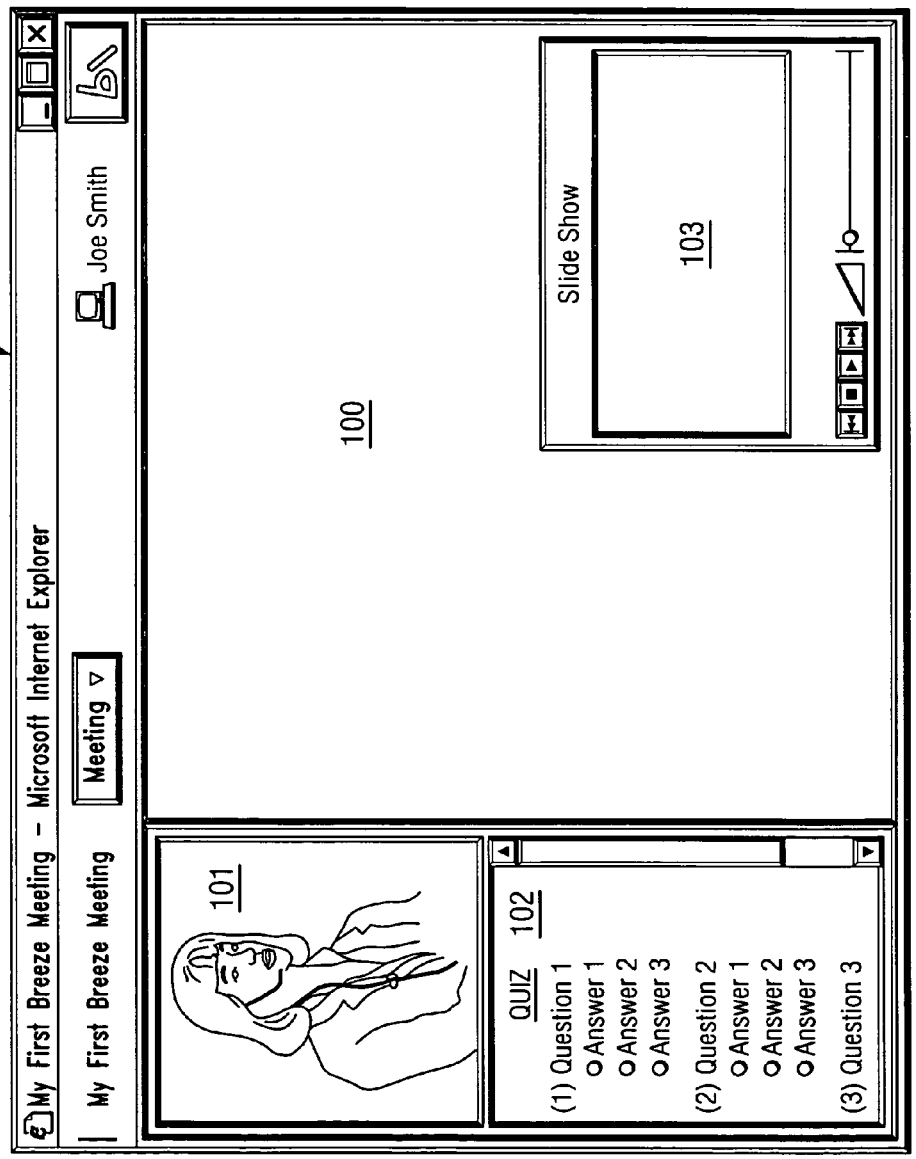
FIG. 1 is a screen shot of a meeting canvas illustrating an active scene displayed to the observing participants of a collaborative electronic meeting.

FIG. 1 is a screen shot of meeting canvas 10 illustrating active scene 100 displayed to the observing participants of a collaborative electronic meeting. Meeting canvas 10 includes podium object 101 that is displaying the video and audio from a camera, quiz object 102 that provides an interactive quiz to the observing participants, and slide show object 103 that presents a slide show in a presentation document format, such as MACROMEDIA INC.'s MACROMEDIA FLASH™, MICROSOFT CORPORATION's POWERPOINT™, or the like. As the electronic meeting proceeds, the observing participants interact with and view the various meeting objects within scene 100.

Figure 2:
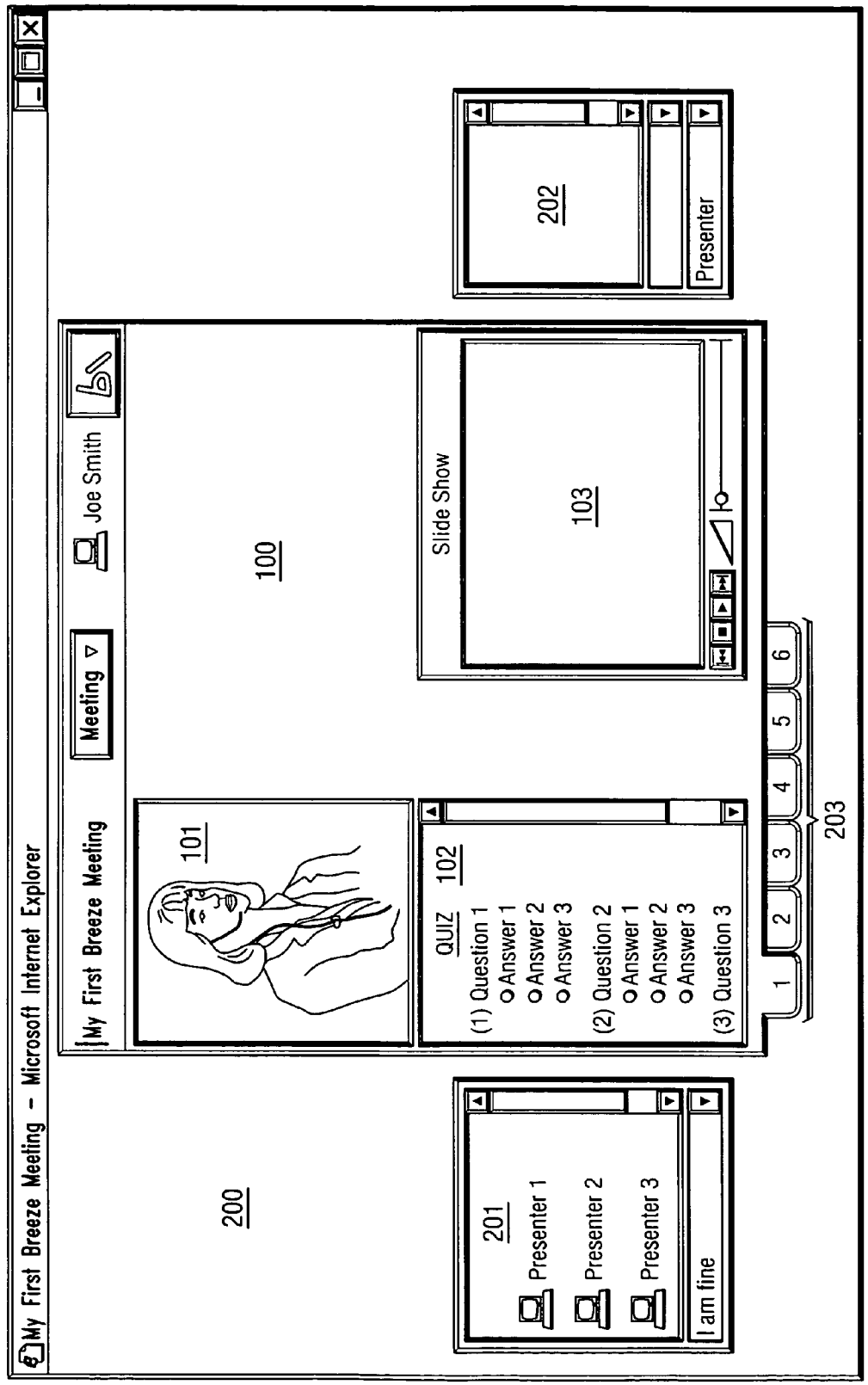
FIG. 2 is a screen shot of an expanded meeting canvas that includes a presenter canvas surrounding the active scene.

FIG. 2 is a screen shot of expanded meeting canvas 20 that includes presenter canvas 200 surrounding scene 100. While the observing participants view only meeting canvas 10 as illustrated in FIG. 1, each meeting presenter views expanded meeting canvas 20 which is essentially meeting canvas 10 (FIG. 1) expanded by presenter canvas 200. Presenter canvas 200 also includes meeting objects that are only visible to or interactive with other meeting presenters. Presenter canvas 200 includes presenter list object 201 that lists each of the presenters in the electronic meeting, presenter chat object 202 that allows direct chat communication between the presenters, and scene tabs 203 that allow the presenters to control the electronic meeting by activating any additional scenes that have been created for that particular meeting. The various meeting objects displayed on scene 100 continue to operate normally in expanded meeting canvas 20 during the electronic meeting. The display of scene 100 is adjusted in expanded meeting canvas 20 to make room for presenter canvas 200. Other than the resizing or moving, scene 100 is the same.

Figure 3:
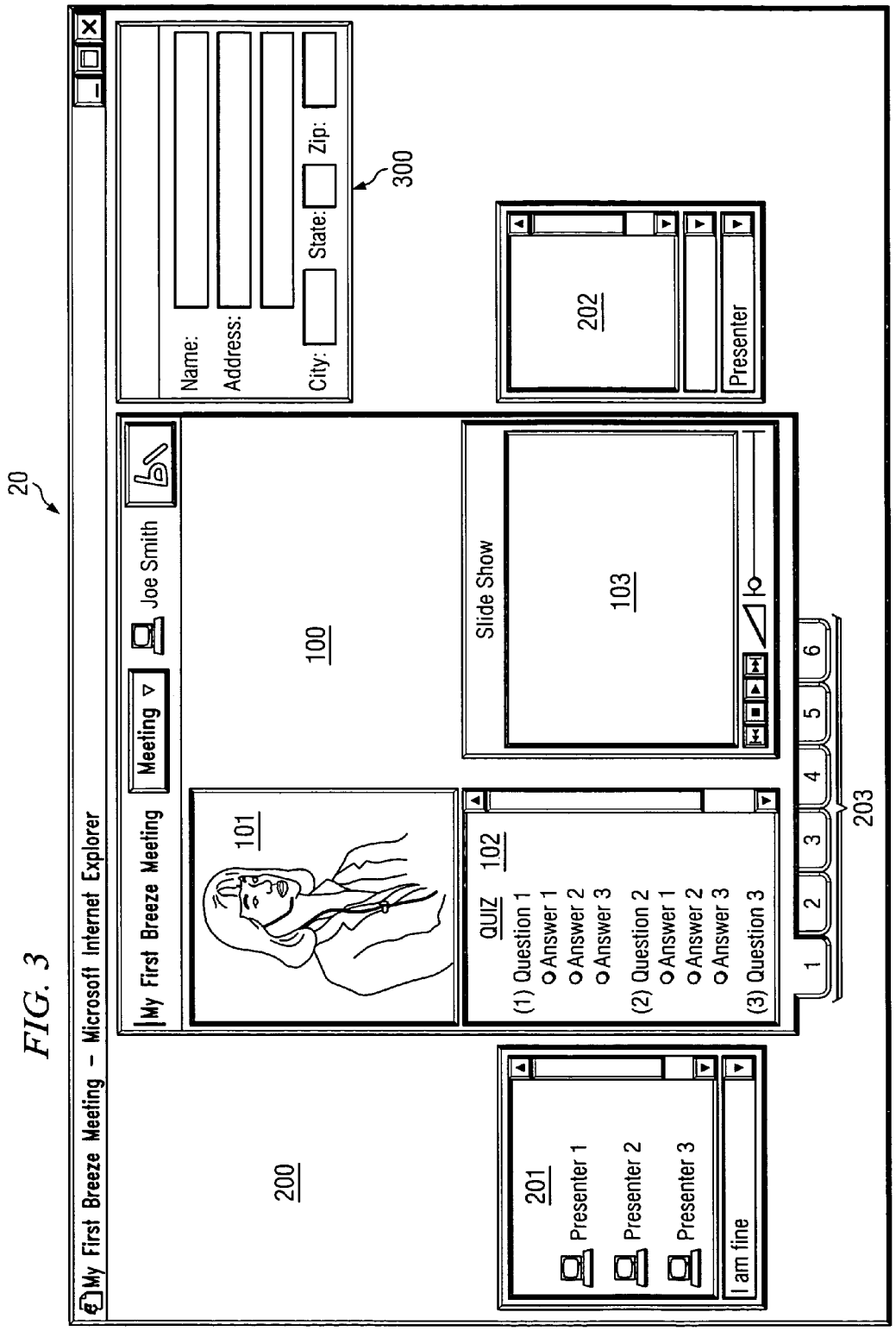
FIG. 3 is a screen shot illustrating an expanded meeting canvas that is staging a new meeting object for the electronic meeting.

FIG. 3 is a screen shot illustrating expanded meeting canvas 20 that is staging new meeting object 300 for the electronic meeting. The interaction that occurs within presenter canvas 200 remains hidden from the observing participants view. Therefore, presenter canvas 20 allows each presenter to modify or create new meeting objects outside of the view of the observing participants. Once created or modified, the presenter may stage the meeting object on presenter canvas 200 until he or she is ready to bring it into the active scene.

Figure 4:
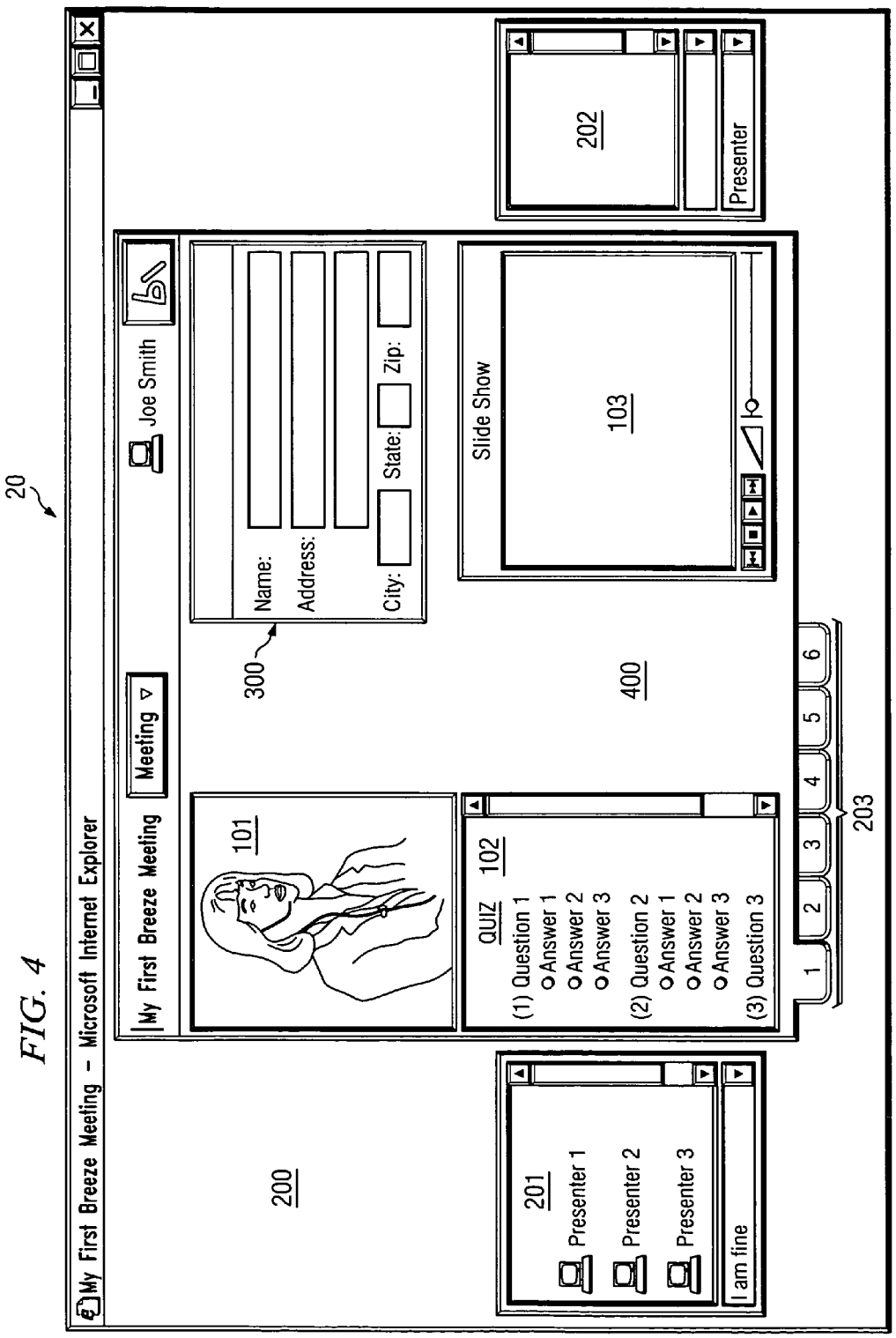
FIG. 4 is a screen shot illustrating a new meeting object that has been added to the active scene.

FIG. 4 is a screen shot illustrating new meeting object 300 that has been added to scene 100. To add the staged meeting object, the presenter needs only to drag it into the scene. Thus, the presenter dragged new meeting object 300 from its staging location on presenter canvas 200 (FIG. 3) to the new location illustrated on scene 100 in FIG. 4.

Figure 5:
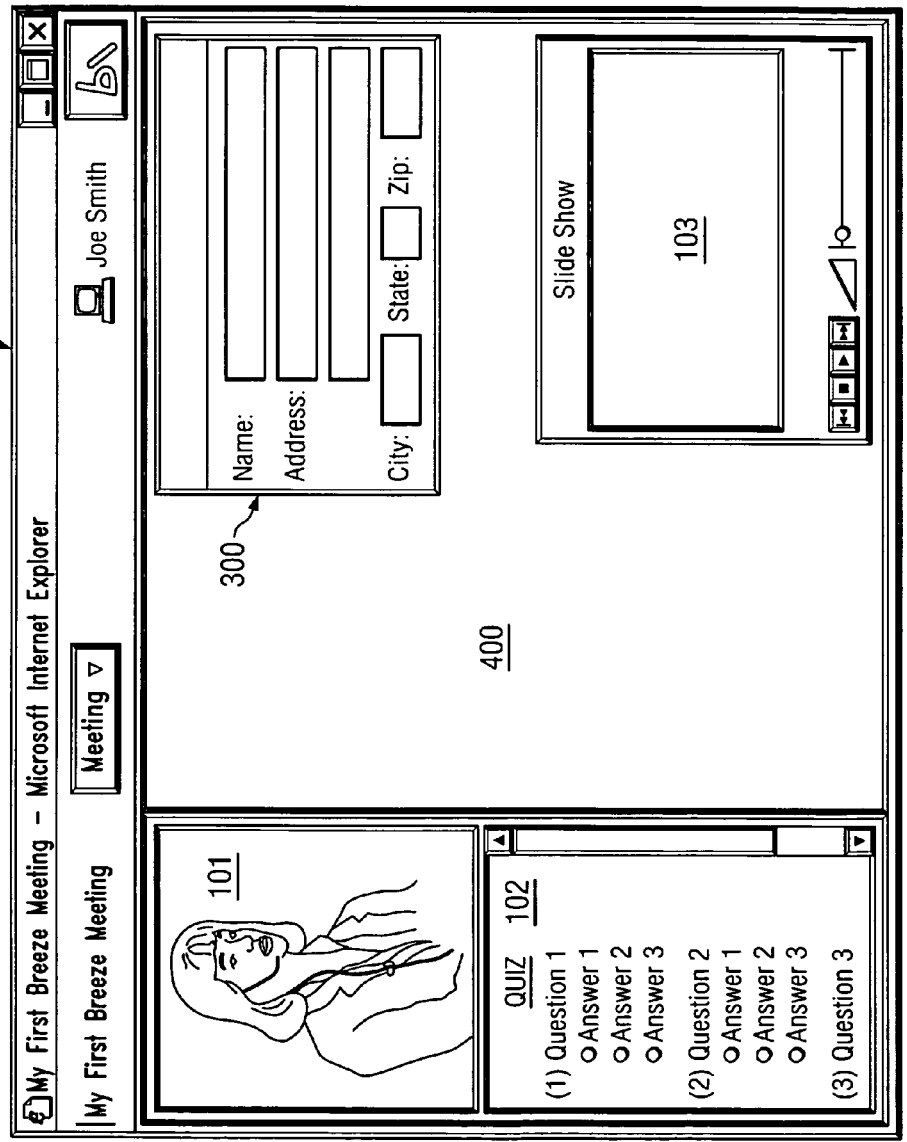
FIG. 5 is a screen shot from an observing participant illustrating a new meeting object on the new active scene.

FIG. 5 is a screen shot from an observing participant illustrating new meeting object 300 on new scene 400. Once new meeting object 300 is dragged onto new scene 400, all of the meeting participants, whether merely observing participants or presenters, may interact or view the object. In the example illustrated in FIG. 5, the observer participants may be able to interact with new meeting object 300 to fill in data for an application connected with the electronic meeting.

The ability of a presenter to view a different meeting canvas than the browsing participants is made possible by an interactive multimedia communication server (iMCS) hosting the electronic meeting. An iMCS operating an electronic meeting application configured according to one embodiment of the present invention is capable of maintaining separate communication streams connected to the same electronic meeting for each meeting participant, including meeting presenters and meeting viewers. The iMCS transmits the communication streams for meeting canvas 10 (FIG. 1) to each of the current observing participants. However, the iMCS also allows a separate communication stream to be sent to the presenters that results in expanded meeting canvas 20 (FIG. 2). When a presenter interacts with objects with the additional presenter's canvas, the data streams connected with those become separate links to the iMCS, yet still integrally related to the electronic meeting. When a presenter drags something from the presenter canvas onto the regular, active scene, iMCS adds the data stream supporting the object to the data stream for the active scene when it removes that data from the separate presenter-only data stream. One example of such an iMCS that includes the capabilities described above is MACROMEDIA INC.'s FLASH COMMUNICATION SERVER™ (FCS). When implemented in the FCS, the client-side of the electronic meeting may be presented to the participants using MACROMEDIA INC.'s MACROMEDIA FLASH™ player.

Figure 6:
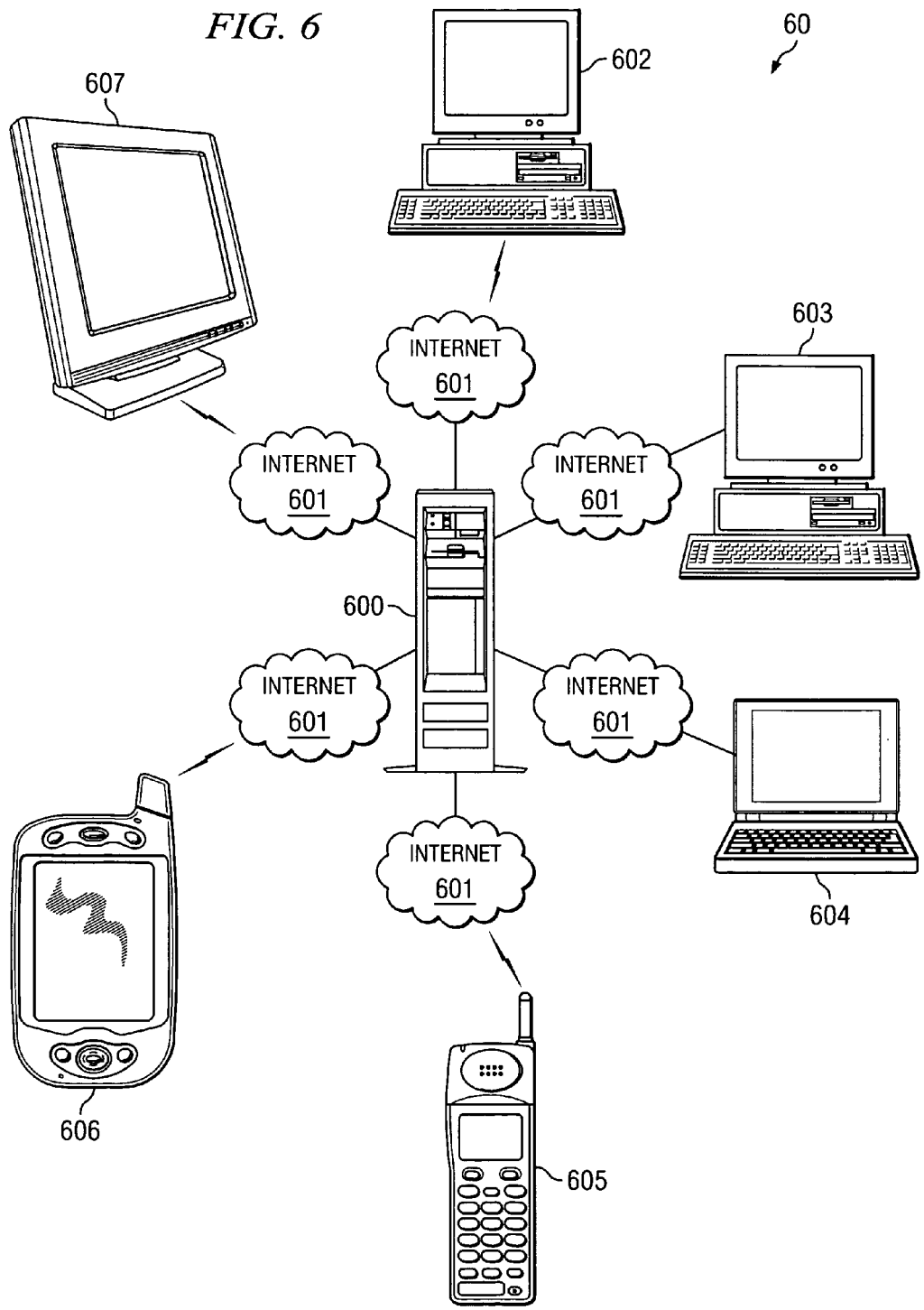
FIG. 6 is a block diagram illustrating an electronic presentation configured according to an additional embodiment of the present invention.

FIG. 6 is a block diagram illustrating electronic presentation 60 configured according to an additional embodiment of the present invention. Electronic presentation 60 is hosted by host server 600 running the server-side portion of an electronic meeting application. The software code disclosed herein (e.g. for performing the operations for presenting electronic presentation 60, determining the meeting participants having presenter rights, and presenting the additional presenter canvas to those participants having presenter rights) may be stored to a computer-readable medium, as is well-known in the art, such as being stored to host server 600. As those of ordinary skill in the art will readily appreciate, such computer-readable medium may comprise, as examples, a hard disk, floppy disk, optical disc, etc. Multiple users, reflected by meeting participants 602-607, each run a client-side portion of the electronic meeting application that communicates with the server-side meeting application on host server 600. During electronic meeting 60, the data streams for the active scene are communicated between host server 600 and meeting participants 602-607 over Internet 601. Some of meeting participants 602-607 are meeting presenters and some are merely meeting observers. For purposes of this hypothetical example, meeting participants 603 and 607 are presenters. Thus, in the present embodiment meeting participants 603 and 607 receive additional data from host server 600 which instructs the client-side portions of the meeting application to insert the presenter canvas including any meeting objects or pods that have been defined for the presenter canvas.

The data or input streams from host server 600 that feed the objects in the presenter canvas are maintained separately for the presenters, meeting participants 603 and 607. If either one of meeting participant 603 and 607 drags a meeting object from the presenter canvas onto the active scene, host server 600 adds the data streams for those objects to the data streams for the active scene. Thus, the active scene is changed during the electronic meeting.

FIG. 7 is a flowchart illustrating example steps that may be executed in implementing one embodiment of the present invention. In step 700, presenter rights are assigned to selected ones of a plurality of meeting participants. An meeting scene is displayed to the plurality of meeting participants, in step 701, where the meeting scene has at least one meeting object arranged on it. In step 702, presenter workspace is added around each meeting scene that is displayed to one of the selected ones with assigned presenter rights. One or more meeting objects are rendered on the presenter workspace, in step 703, wherein access to the meeting objects is limited to the selected ones with assigned presenter rights. In step 704, data feeds for the meeting objects on the active meeting scene are maintained separately from the data feeds for the presenter workspace. In optional step 705, one or more of the meeting objects on the presenter workspace may be moved to the active meeting scene. In response to the moving, the data feeds for the moved meeting object are associated with the data feeds for the meeting objects on the active scene, in optional step 706. The moved meeting object, along with the other meeting objects, are then displayed on the active meeting scene, in optional step 707.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
 displaying a meeting interface to each of a plurality of meeting participants in a collaborative electronic presentation, the meeting interface having at least one meeting object arranged the meeting interface;
 assigning a presenter right to presenters of the plurality of meeting participants;
 exclusively appending an additional workspace to each meeting interface displayed to presenters of the plurality of meeting participants without appending the additional workspace to the meeting interface displayed to non-presenters of the plurality of meeting participants;
 including an additional meeting object associated with the collaborative electronic presentation on the additional workspace; and
 responsive to at least one of the presenters moving the additional meeting object onto the meeting interface, placing the additional meeting object within the meeting interface and rendering the additional meeting object viewable to the plurality of meeting participants.

2. The method of claim 1, wherein including an additional meeting object associated with the collaborative electronic presentation on the additional workspace, comprises:
 managing input streams for the at least one meeting object distinctly from an input stream for the additional meeting object.

3. The method of claim 2, wherein responsive to at least one of the presenters moving the additional meeting object onto the meeting interface, placing the additional meeting object within the meeting interface and rendering the additional meeting object viewable to the plurality of meeting participants, comprises:
 relating the input stream for the additional meeting object with the input streams for the at least one meeting object.

4. A method comprising:
 displaying a meeting space that is electronically accessible and viewable by a plurality of users, the meeting space having a plurality of meeting objects arranged on the meeting space;
 assigning a presenter right to select ones of the plurality of users;
 rendering, onto a display that is viewable only by the select ones of the plurality of users to whom the presenter right is assigned, a presenter canvas associated with an electronic meeting presented on the meeting space, wherein an additional meeting object that is related to the electronic meeting is displayed on the presenter canvas; and
 responsive to at least one of the select ones of the plurality of users to whom the presenter right is assigned, moving the additional meeting object onto the displayed meeting space, placing the additional meeting object within the meeting space and rendering the additional meeting object viewable to the plurality of users.

5. The method of claim 4, wherein rendering, onto the display that is viewable only by the select ones of the plurality of users to whom the presenter right is assigned, the presenter canvas associated with the electronic meeting presented on the meeting space, comprises:
 maintaining data feeds for the plurality of meeting objects arranged on the meeting space distinct from a data feed for the additional meeting object displayed on the presenter canvas.

6. The method of claim 5, wherein responsive to at least one of the select ones of the plurality of users to whom the presenter right is assigned moving the additional meeting object onto the meeting space displayed, placing the additional meeting object within the meeting space and rendering the additional meeting object viewable to the plurality of users, comprises:
 associating the data feeds for the plurality of meeting objects with the data feed for the additional meeting object.

7. The method of claim 4, wherein the presenter right is not assigned to all of the plurality of meeting participants.

8. The method of claim 7, wherein the presenter canvas is not added to each meeting space displayed to ones of the plurality of meeting participants who are not assigned the presenter right.

9. A collaborative electronic meeting environment that is generated by at least one computer executing software code that is stored on a non-transient computer-readable medium, the generated collaborative electronic meeting environment comprising:
 a meeting space electronically accessible and viewable by a plurality of users;
 a plurality of meeting objects arranged on the meeting space;
 a presenter right assignable to select ones of the plurality of users; and
 a presenter canvas associated with an electronic meeting being presented on the meeting space and having one or more additional meeting objects displayed thereon, wherein the one or more additional meeting objects are related to the electronic meeting, the presenter canvas rendered onto a display that is viewable only by the select ones of the plurality of users to whom the presenter right is assigned, wherein ones of the one or more additional meeting objects are placed within the meeting space and rendered viewable by the plurality of users responsive to at least one user of the select ones of the plurality of users to whom the presenter right is assigned moving the ones of the one or more additional meeting objects onto the meeting space rendered on the display.

10. The collaborative electronic meeting environment of claim 9, wherein interaction with the one or more additional meeting objects is restricted to the select ones of the plurality of users having a presenter right.

11. The collaborative electronic meeting environment of claim 10, further comprising:
a server-side electronic meeting application for managing data streams for the collaborative electronic meeting environment, wherein the server-side electronic meeting application maintains a distinction between data streams for the plurality of meeting objects and data streams for the one or more additional meeting objects.

12. The collaborative electronic meeting environment of claim 11, wherein the server-side electronic meeting application integrates the data streams for the one or more additional meeting objects with the data streams for the plurality of meeting objects responsive to at least one user of the select ones of the plurality of users having presenter rights moving one of the one or more additional meeting objects onto the meeting space.

13. The collaborative electronic meeting environment of claim 9, wherein the presenter right designates the select ones of the plurality of users as a presenter of information in the collaborative electronic meeting.

14. The collaborative electronic meeting environment of claim 13, wherein at least one of the plurality of users is not assigned the presenter right.

15. The collaborative electronic meeting environment of claim 14, wherein the at least one of the plurality of users not assigned the presenter right is designated as a non-presenting observer of the collaborative electronic meeting.

16. A computer program product having computer program logic stored on a non-transitory computer-readable medium, the computer program product comprising:
code for displaying a meeting space that is electronically accessible and viewable by a plurality of users, the meeting space having a plurality of meeting objects arranged on the meeting space;
code for assigning a presenter right to select ones of the plurality of users;
code for rendering, onto a display that is viewable only by the select ones of the plurality of users to whom the presenter right is assigned, a presenter canvas associated with an electronic meeting presented on the meeting space, wherein an additional meeting object that is related to the electronic meeting is displayed on the presenter canvas; and
code for, responsive to at least one of the select ones of the plurality of users to whom the presenter right is assigned, moving the additional meeting object onto the displayed meeting space, placing the additional meeting object within the meeting space and rendering the additional meeting object viewable to the plurality of users.

17. The computer program product of claim 16, wherein code for rendering, onto the display that is viewable only by the select ones of the plurality of users to whom the presenter right is assigned, the presenter canvas associated with the electronic meeting presented on the meeting space, comprises:
maintaining data feeds for the plurality of meeting objects arranged on the meeting space distinct from a data feed for the additional meeting object displayed on the presenter canvas.

18. The computer program product of claim 17, wherein code for, responsive to at least one of the select ones of the plurality of users to whom the presenter right is assigned moving the additional meeting object onto the meeting space displayed, placing the additional meeting object within the meeting space and rendering the additional meeting object viewable to the plurality of users, comprises:
associating the data feeds for the plurality of meeting objects with the data feed for the additional meeting object.

* * * * *

UNITED STATES PATENT AND TRADEMARK OFFICE
CERTIFICATE OF CORRECTION

| | | |
|---|---|---|
| PATENT NO. | : 8,091,029 B1 | Page 1 of 1 |
| APPLICATION NO. | : 10/856734 | |
| DATED | : January 3, 2012 | |
| INVENTOR(S) | : Jonathan Gay and Giacomo Guilizzoni | |

It is certified that error appears in the above-identified patent and that said Letters Patent is hereby corrected as shown below:

Column 5, Line 43
Insert the word --on-- before the word *the*

Signed and Sealed this
Thirteenth Day of March, 2012

David J. Kappos
*Director of the United States Patent and Trademark Office*